United States Patent
Goodman

[11] Patent Number: 6,164,660
[45] Date of Patent: Dec. 26, 2000

[54] REBUILDABLE RADIAL LIP SEAL

[75] Inventor: James R. Goodman, Corona, Calif.

[73] Assignee: Saint-Gobain Performance Plastics Corporation, Wayne, N.J.

[21] Appl. No.: 09/291,257

[22] Filed: Apr. 13, 1999

Related U.S. Application Data

[60] Provisional application No. 60/082,041, Apr. 16, 1998.
[51] Int. Cl.[7] ....................................... F16J 15/32
[52] U.S. Cl. ........................... 277/556; 277/309; 277/351; 277/394
[58] Field of Search ................. 277/556, 309, 277/351, 394, 549, 551

[56] References Cited

U.S. PATENT DOCUMENTS

| | | |
|---|---|---|
| 2,615,761 | 10/1952 | Skinner . |
| 3,062,555 | 1/1962 | Britton . |
| 3,938,813 | 2/1976 | Forch . |
| 3,975,026 | 8/1976 | Boyle et al. . |
| 4,190,258 | 2/1980 | Arai et al. . |
| 4,243,235 | 1/1981 | Repella . |
| 4,723,350 | 2/1988 | Kobayashi et al. . |
| 5,149,106 | 9/1992 | Takenema et al. . |

Primary Examiner—Terry Lee Melius
Assistant Examiner—William L. Miller
Attorney, Agent, or Firm—Christie, Parker & Hale, LLP

[57] ABSTRACT

A rebuildable radial lip seal having a replaceable sealing element for sealing around a movable shaft and adapted for removable placement within a seal housing. The rebuildable radial seal comprises an annular sealing body which extends radially between an annular inner seal surface and an annular outer seal surface. The inner seal surface defines a first inner diameter and includes a circumferential rib which protrudes radially inward from the inner surface. An annular end flange is coaxially engageable with the seal body. The end flange includes a coaxially protruding annular rim which is engageable within the first inner diameter of the seal body to form a circumferential inner slot between the circumferential rib and the inner surface of the seal body and the annular rim on the end flange. An annular sealing element having an inner sealing lip is sealably captured within the inner circumferential slot formed between the seal body and the end flange. Fasteners coaxially secure he seal body and the end flange together and sealably compressed the axially aligned sealing element therebetween. A circumferential outer seal seals between the outer seal surface and a cylindrical bore within a seal housing.

21 Claims, 7 Drawing Sheets

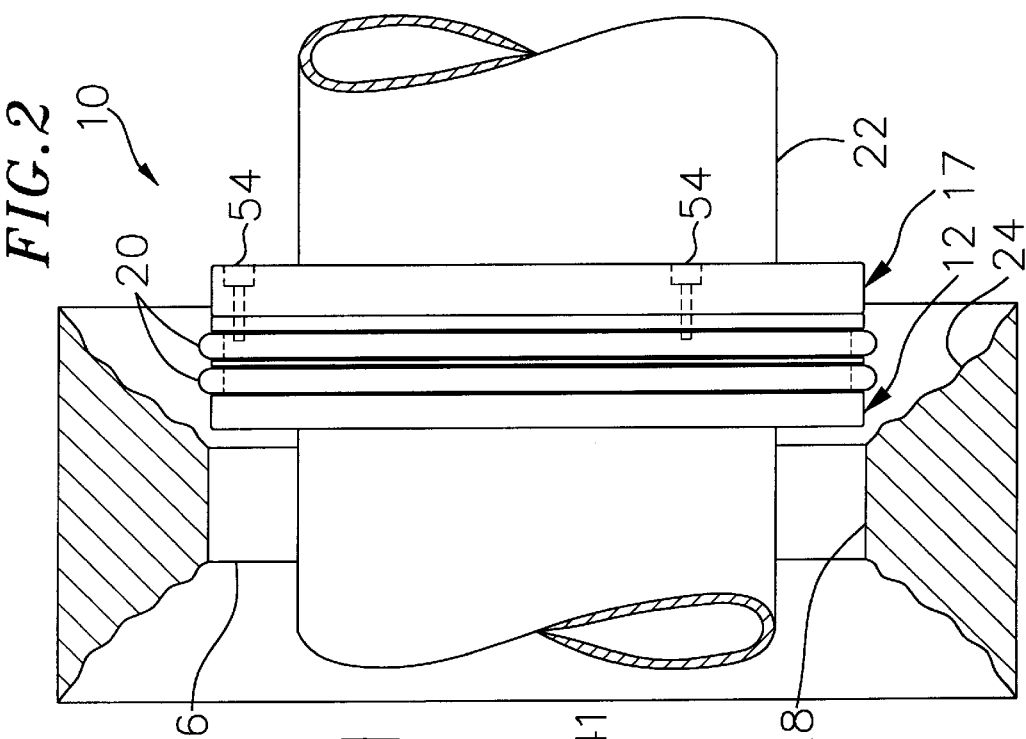
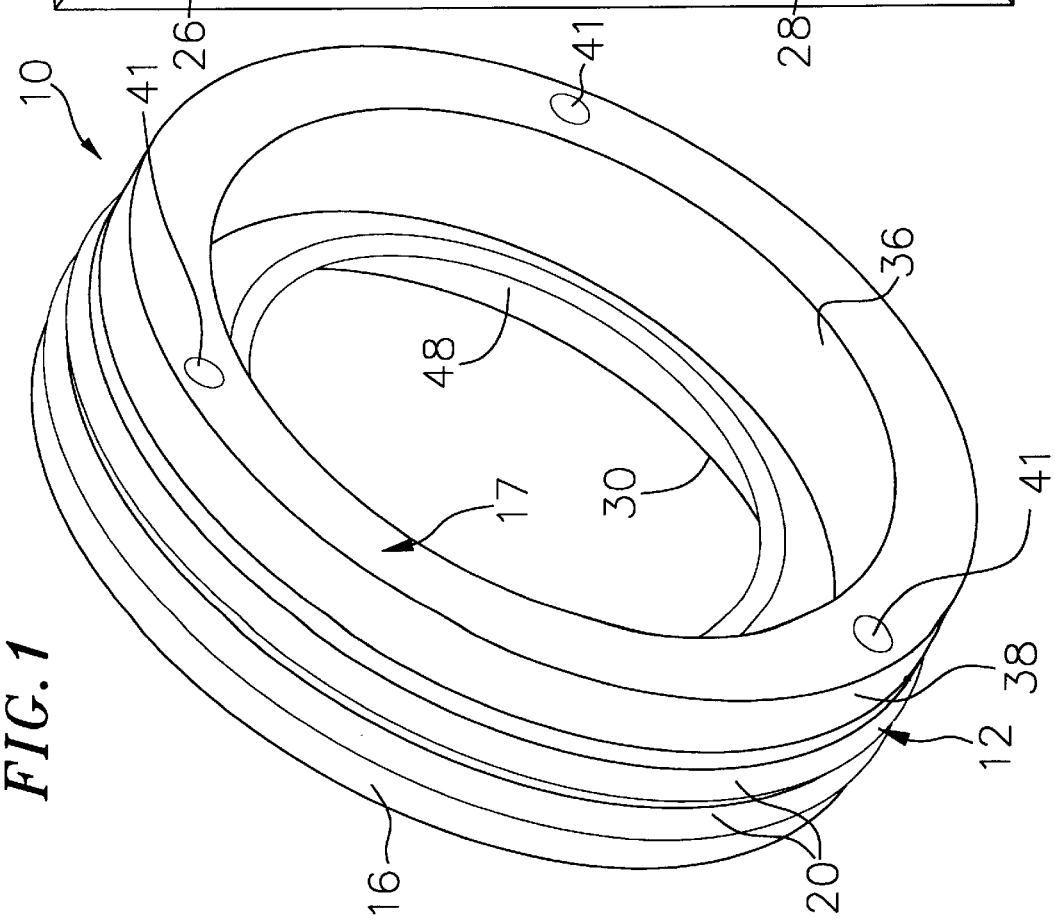

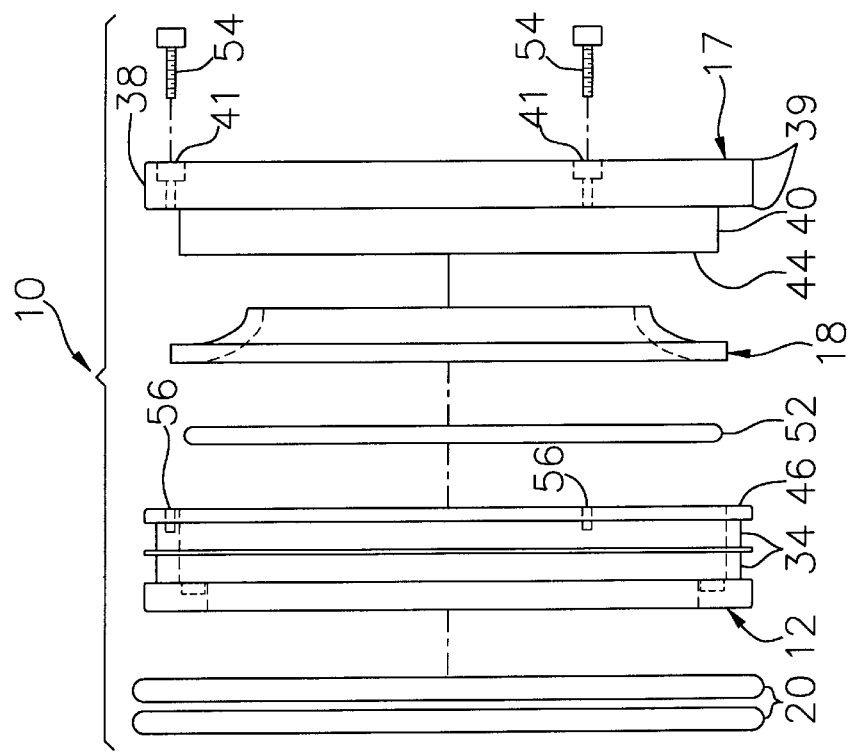
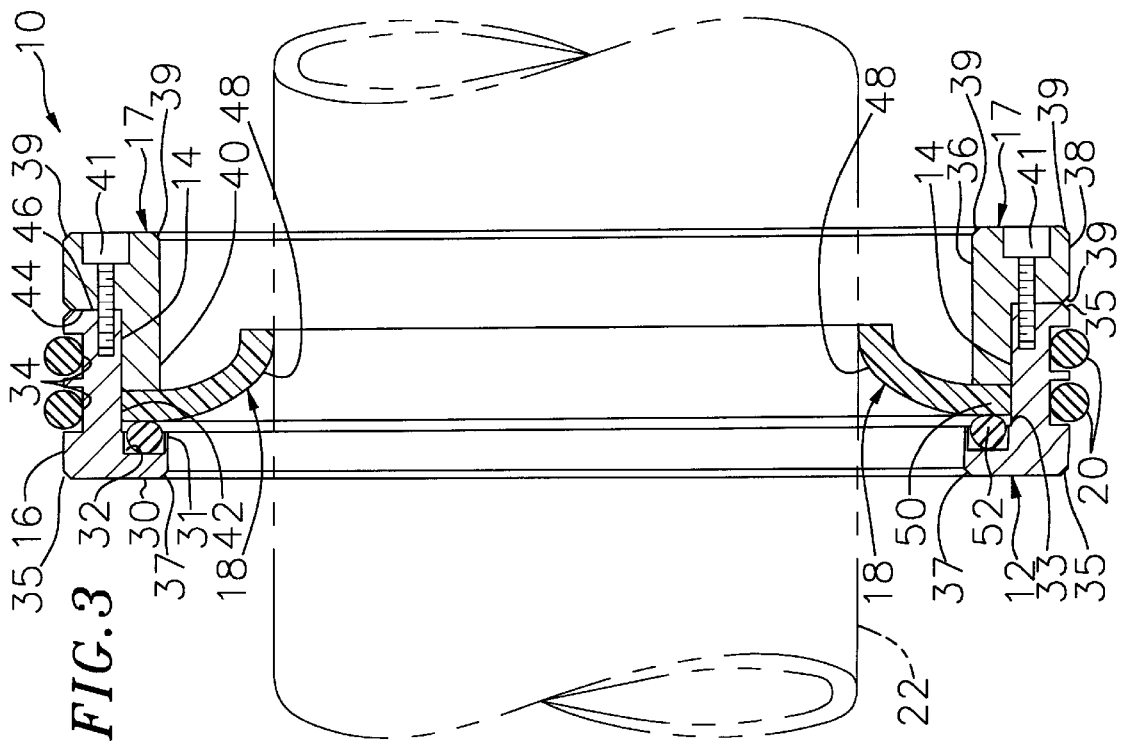

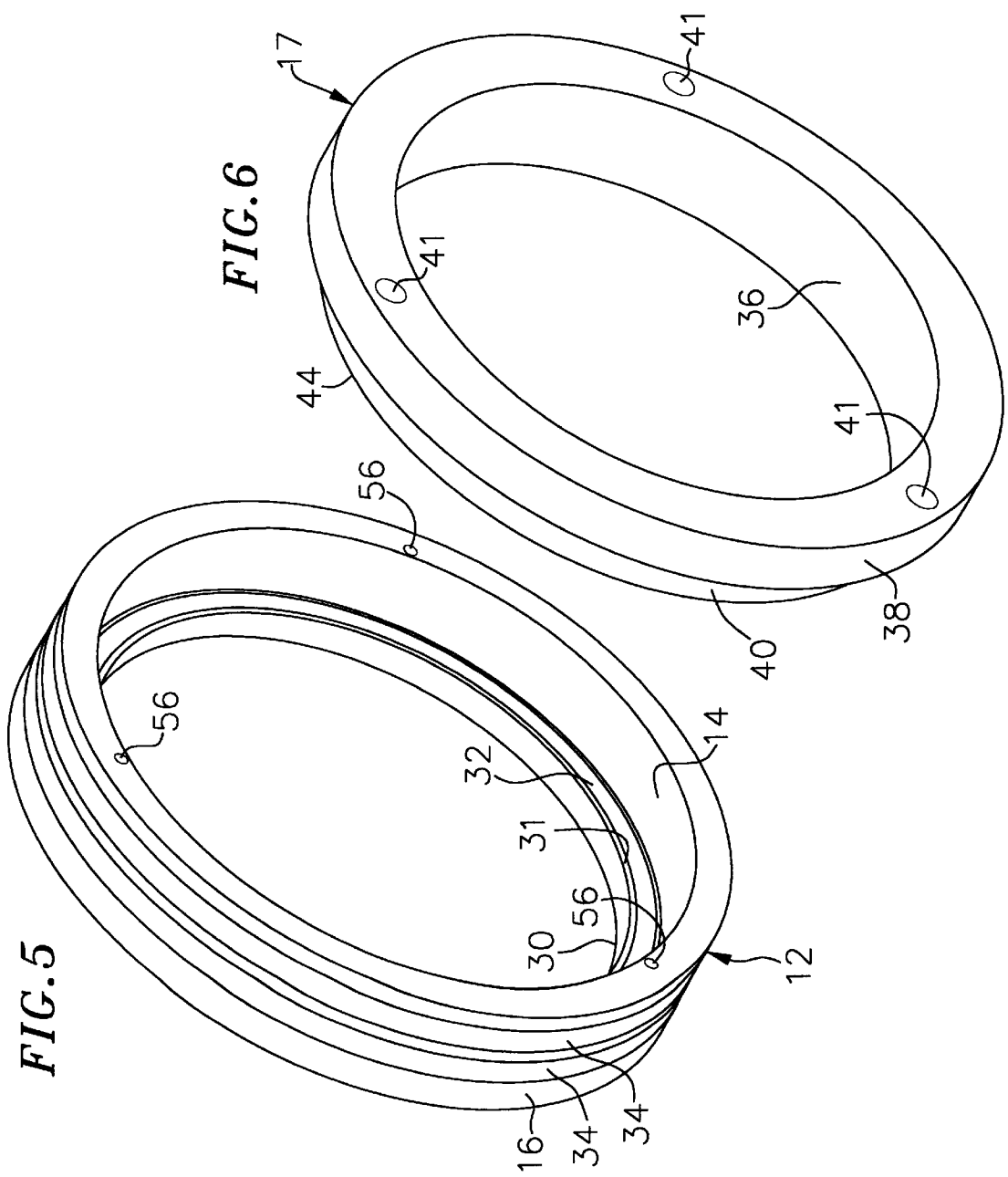

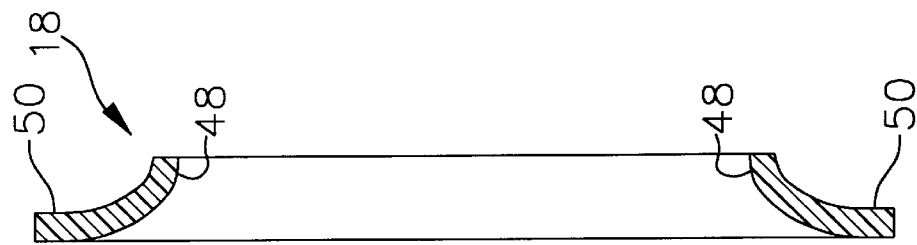
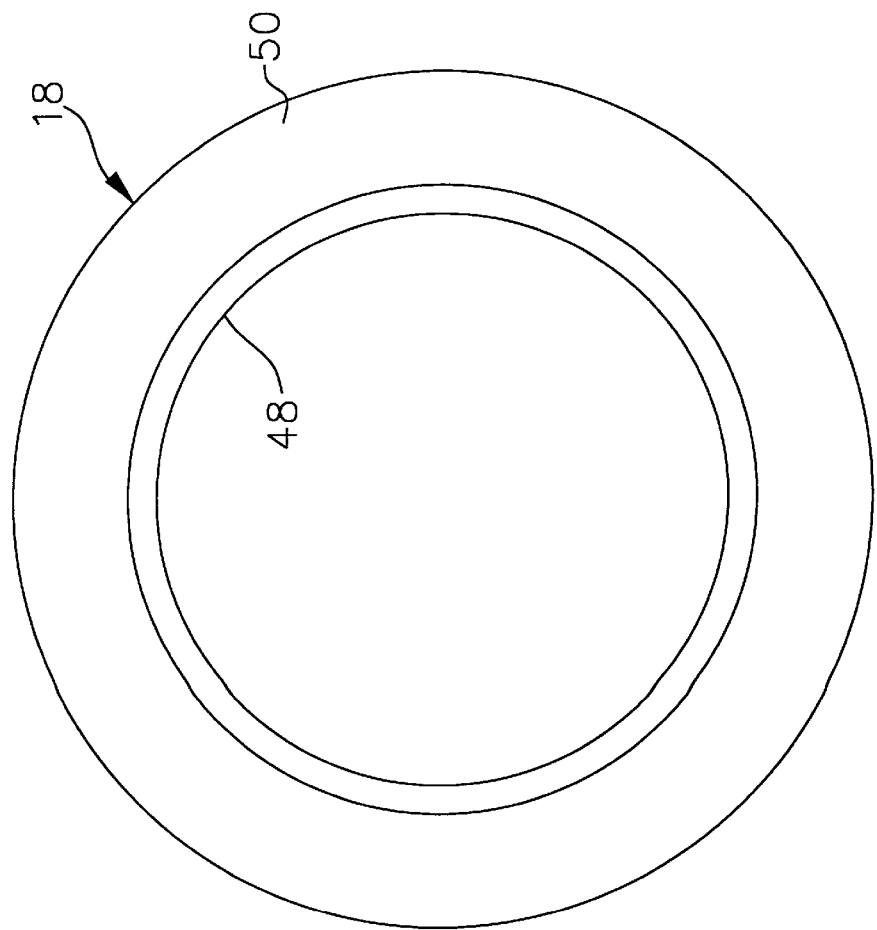

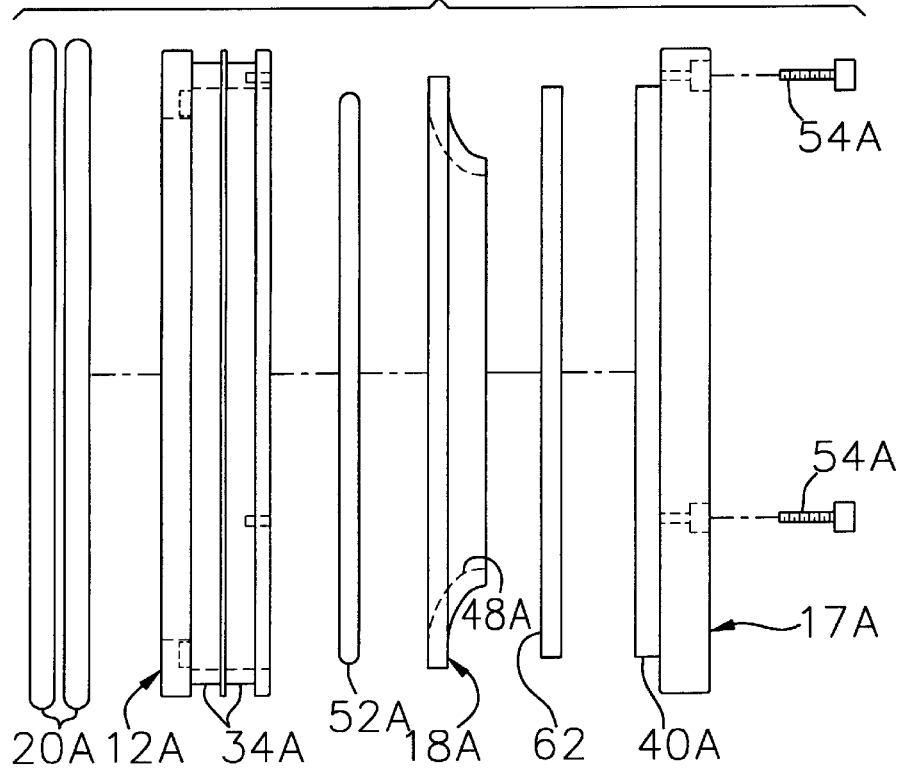
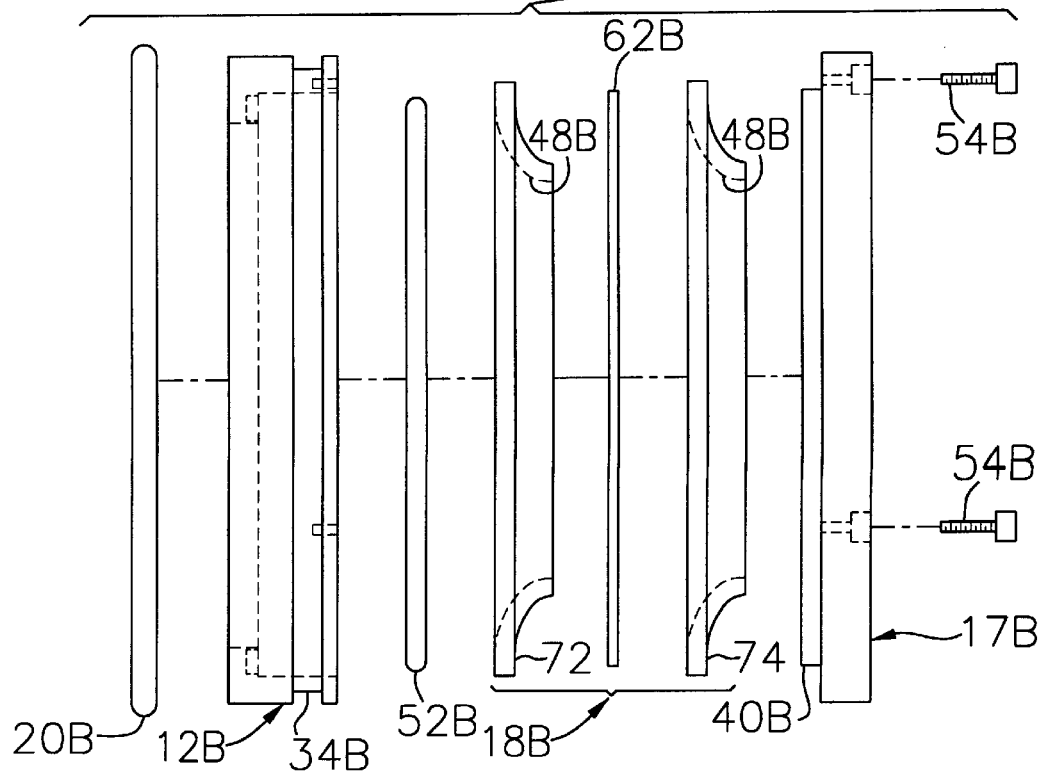

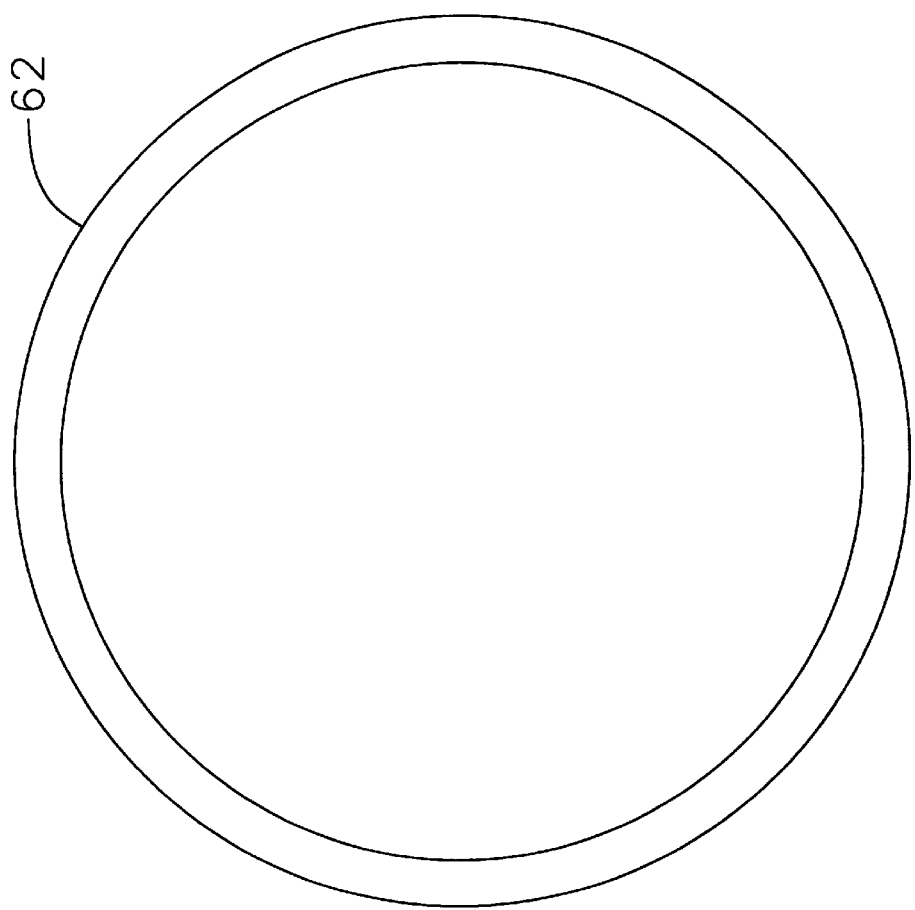

REBUILDABLE RADIAL LIP SEAL

CROSS-REFERENCE TO RELATED PATENT APPLICATION

This patent application claims priority of U.S. Provisional Patent Application No. 60/082,041 that was filed on Apr. 16, 1998.

FIELD OF THE INVENTION

This invention relates generally to seals for sealing around a shaft and more particularly, to a rebuildable radial lip seal for sealing around a movable shaft.

BACKGROUND OF THE INVENTION

Radial lip seal assemblies are used to prevent fluids (liquids or gasses) from leaking around a cylindrical device such as a piston, piston rod, shaft or the like, from a relatively higher pressure region in which the shaft or other cylindrical device is mounted to a relatively lower pressure region. Such radial lip seal assemblies typically include a circular or annular seal body which is sealably fit within a bore formed within a housing surrounding the cylindrical device. An annular-sealing lip extends radially inward from the seal body to form an annular contact around the shaft and provide a slidable sealing surface.

Prior art radial lip seal technology began primarily in the early 1900's. These early lip seals utilized a metallic case that clamped a specially treated piece of leather. The case was sealably attached to the seal housing. The leather was used as a sealing lip and was the wear part of the seal. Elastomer materials soon replaced the leather and greatly enhanced the life and performance of these rotating shaft seals. These elastomer seals were commonly pressed into a seal bore formed in the seal housing. Further developments in seal technology and sealing materials lead to the use of fluoropolymer or fluoroplastic materials for the sealing lip. These fluoroplastic materials offered extended wear life, better chemical compatibility and operability in higher temperature and pressure ranges. In addition, fluoroplastic materials typically do not have a shelf life as compared to the elastomer lip seals. However, radial lip shaft seals made with fluoroplastic materials have several disadvantages. For example, fluoroplastic lip seals can easily cost several times that of similar elastomer lip seals. The added advantages in performance of the fluoroplastic lip seals are thus, sometimes overshadowed by the high seal cost. In addition, fluoroplastic lip seals are susceptible to flow creep, compression set and resizing problems. These problems can lead to premature leakage of the seal.

Presently, the most commonly used rotary lip seals are elastomer "rubber" lip seals. These elastomer lip seals are typically manufactured with a metallic internal member surrounded by an elastomer. The elastomer forms a radially inward extending annular lip and is adapted to make sealing contact against the rotating or reciprocating shaft. Extension springs are commonly used to energize or otherwise maintain the sealing lip in sealable contact against the shaft. These elastomer lip seals can be produced at a relatively low cost compared to most other types of sealing systems. As a result, these elastomer lip seals are widely used throughout the world.

As an alternative to the elastomer type lip seals, fluoroplastic lip seals may be used. As mentioned, these fluoroplastic lip seals typically surpass the performance of the more conventional elastomer lip seal. However, these fluoroplastic lip seals are typically more expensive due to the high cost of the base materials. Fluoroplastic materials are also difficult to bond or mold to the metal components, forcing even higher costs. In addition, the installation of metal cased fluoroplastic seals usually requires a press fit into a seal bore within the seal housing. Special press fit tools may be required to force the seal into the bore. Removal of the seal can be difficult and may score or damage the seal housing bore. Improper handling of the fluoroplastic seal material can lead to leakage across the seal as well as reduced seal life.

When radial lip seals leak or otherwise fail due to wear or damage, they are typically removed and replaced with a new seal. In addition to the cost of the seal itself, seal replacement can be quite expensive and in some applications, economically prohibitive due to the effort required to remove and reinstall the seal. There is thus, a need for a radial lip seal which can be easily replaced or more efficiently repaired and at a more effective cost. In addition, there is a need for a fluoroplastic radial lip seal which is less expensive and is less difficult to install.

It is therefore desirable to provide a radial lip seal having a fluoroplastic sealing element which is simple and economical to both install and remove. In addition, it is desirable that the improved radial lip seal be rebuildable so that the fluoroplastic sealing element may be replaced without the cost of replacing the entire seal. The improved lip seal should have enhanced reliability and longer useful life compared to prior art radial lip seals.

SUMMARY

The present invention overcomes the aforementioned problems by providing a radial lip seal which is both readily removable from the seal housing and rebuildable to enable replacement of the sealing element or multiple sealing elements. By providing a radial lip seal which is easily removable from the seal housing, it may be quickly interchanged with a new radial lip seal to reduce down time of the respective apparatus. Additionally, the radial lip seal may be replaced with a seal having a different type of sealing element directed to an improved seal or alternatively, to different sealing conditions or materials. By providing a radial lip seal which has separable components to allow access to the sealing element, costly replacement of the entire radial lip seal is no longer required. Seal replacement tasks can advantageously become seal repair tasks and generally limited to merely replacing the sealing element. By providing a radial lip seal which is easily removable and replaceable within the seal housing, the seal can be removed and the sealing element may be quickly and economically rebuilt. The seal can then be quickly replaced within the seal housing.

The present invention is generally directed to a radial lip seal which has an annular seal body that can be readily seated within a seal bore as well as readily removed from the bore for replacement or repair. The seal body is axially separable from a coaxially aligned annular end flange to allows access to the internally captured sealing element. More specifically, the present invention is directed to a rebuildable radial seal having a replaceable sealing element for sealing around a movable shaft and for removable placement within a seal housing.

The rebuildable radial seal comprises an annular sealing body or sealing ring which extends radially between an annular inner surface and an annular outer surface. The inner surface forms a first inner diameter and is configured to be generally coaxially aligned with a shaft passing therethrough. A circumferential rib protrudes inwardly from the inner surface and is also configured to be generally coaxially aligned with the shaft. The outer surface defines an outer diameter which is less than the diameter of a seal bore formed within a seal housing and adapted for receiving the respective radial lip seal. The outer surface includes a circumferential groove for supporting an outer sealing element. The outer sealing element is adapted to seal between the outer surface and the bore within the seal housing.

An annular end flange is provided for axial engagement with the sealing body. The end flange includes a coaxially protruding annular rim which is coaxially engageable within the inner diameter of the seal body. When the end flange is coaxially engaged with the seal body, a circumferential inner slot is formed between the radial circumferential rib on the inner surface of the seal body and the annular rim axially protruding from the end flange. The end flange is also configured so that its outer diameter is not less than the outer diameter of the sealing body and so that its inner diameter not less than an inner diameter defined by the inwardly protruding circumferential rib on the seal body.

An annular sealing element is disposed within the inner circumferential slot groove. The annular sealing element is a fluoroplastic material forming a ring having a generally flat outer circumferential portion which is sealably captured within the inner circumferential groove between the seal body and the end flange. The annular sealing element protrudes radially inward from the outer circumferential portion to form a sealing lip. This sealing lip is adapted specifically for sealable and slidable contact against the shaft and may be configured in a variety of differing cross sections depending on the particular application.

During assembly of the rebuildable radial seal of the present invention, the sealing element is placed within the inner diameter of the seal body and adjacent the inwardly protruding circumferential rib. To enhance sealing between the sealing element and the seal body, an annular sealing ring is placed between the inwardly protruding circumferential rib and the sealing element. The end flange is then coaxially engaged into the inner diameter of the seal body so that the axially protruding annular rim contacts the outer diametrical portion of the sealing element. Further engagement of the end flange into the seal body further narrows the inner circumferential slot formed therebetween. This narrowing leads to a compression of the inner sealing O-ring and the sealing element within the inner circumferential slot and specifically, between the inwardly protruding circumferential rib of the seal body and the axially protruding annular rim on the end flange. This compression effectively seals the sealing element with the seal body. Fasteners are used to coaxially secure the end flange to the seal body and maintain the sealing element sealably compressed therebetween.

In another aspect of the present invention, the sealing element comprises a plurality of spaced-apart fluoroplastic annular sealing elements. This configuration provides greater sealing reliability in many applications. More specifically, the sealing element includes a first annular seal which is located adjacent the inwardly protruding circumferential rib on the seal body and a second annular seal which is placed against the axially protruding rim on the end flange. A spacing washer is placed between the first and second seals to provide axial separation.

In yet another aspect of the present invention, a pair of spaced-apart annular grooves are formed within the outer surface of the seal body. Each of these grooves is configured to support a sealing O-ring which respectively protrudes radially outwardly of the outer surface of the seal body. The sealing O-rings provide a sealable contact between the seal body and the seal bore within the seal housing.

This invention, together with the additional features and advantages thereof, which is only summarized in the foregoing passages, will become more apparent to those of skill in the art upon reading the description of the preferred embodiments, which follows in the specification taken together with the drawings.

DESCRIPTION OF THE DRAWINGS

These and other features and advantages of the present invention will become appreciated as the same becomes better understood with reference to the specification, claims and drawings wherein:

FIG. 1 is a perspective view of a rebuildable radial lip seal constructed according to the principles of the present invention;

FIG. 2 is a side view of the seal of FIG. 1 shown surrounding a shaft: and adjacent a seal bore;

FIG. 3 is a cross sectional view of the seal of FIG. 1;

FIG. 4 is an exploded view of the seal of FIG. 1;

FIG. 5 is a perspective view of an embodiment of an annular seal body constructed according to the principles of the present invention;

FIG. 6 is a perspective view of an embodiment of an annular end flange constructed according to the principles of the present invention;

FIG. 7 is a front view of an embodiment of a sealing element constructed according to the principles of the present invention;

FIG. 8 is a sectional view of the sealing element shown in FIG. 7;

FIG. 10 is an exploded view of an alternative embodiment of a rebuildable radial lip seal constructed according to the principles of the present invention;

FIG. 11 is an exploded view of another alternative embodiment of a rebuildable radial lip seal constructed according to the principles of the present invention and shown incorporating a pair of spaced-apart sealing elements;

FIG. 12 is a sectional view of an embodiment of a spacing washer constructed according to the principles of the present invention; and FIG. 13 is a front view of the spacing washer shown in FIG. 12.

DETAILED DESCRIPTION OF THE INVENTION

Figure 9A:
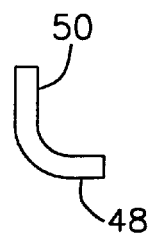
FIGS. 9A–9H is a sectional view of a variety of alternative sealing elements.

Referring now to the drawings, where like reference numerals designate identical or corresponding parts throughout the several views and embodiments, an embodiment of a rebuildable radial lip seal constructed according to the principles of the present invention is illustrated in FIG. 1 and designated by reference numeral 10. As shown, the rebuildable radial lip seal or simply rebuildable seal 10 includes an annular seal ring or body 12 which extends radially between an annular inner surface 14 (FIG. 5) and an annular outer surface 16. Engaged with the seal body 12 is an annular end flange 17. A sealing element 18 protrudes radially inward from both the seal body 12 and the engaged end flange 17. An outer sealing element 20 is also shown circumferentially surrounding the outer surface 16 of the seal body 12.

Referring now to FIG. 2, the rebuildable seal 10 is shown surrounding a shaft 22 and adjacent a seal housing 24. The shaft 22 may be any cylindrical structure, such as, for example, a piston, a piston rod or, any other type of shaft. In addition, the shaft 22 may be a movable shaft, such as a rotating shaft or reciprocating shaft. However, the rebuildable seal 10 may be advantageously configured to seal around static as well as dynamic shafts.

As illustrated, the shaft 22 passes through the seal housing structure 24. This seal housing 24 may be any structure which surrounds the shaft 22 and provides a barrier between a region of higher pressure and a region of lower pressure or between differing fluids. Typically, the seal housing 24 is constructed from a structural material such as a metal, but may be constructed of any material capable of structurally supporting the loads transmitted through the rebuildable seal 10 and the shaft 22. The seal housing 24 must also resisting the environmental conditions and stresses of each particular application, including temperature extremes and compatibility with any fluids.

A seal bore 26 is formed through the seal housing 24. The seal bore 26 is shown adjacent the rebuildable seal 10 and is adapted for receiving the rebuildable seal 10 in a conventional manner as is known in the art of radial seal technology. The bore 26 is preferably formed having an inner surface 28 which is coaxial with the shaft 22.

Referring now to FIGS. 3 and 4, the rebuildable seal 10 will be described in greater detail. In general, the rebuildable seal of the present invention is directed to a radial lip seal having a replaceable sealing element for sealing around a movable shaft and for removable placement within a seal housing. The rebuildable seal 10 includes the annular seal body 12 which is coaxially engaged with the end flange 17 to sealably retain the sealing element 18 therebetween.

Referring now to FIG. 5, in conjunction with FIGS. 2 through 4, the seal body 12 will be described in greater detail. As previously mentioned, the seal body 12 is an annular structure which extends radially from the inner diametrical surface 14 to the outer diametrical surface 16. The inner surface 14 is preferably circular and defines a circular first inner diameter. A circumferential ridge or rib 30 extends radially inward from the inner surface 14. Preferably, this circumferential rib 30 is also circular and defines a diameter less than the first inner diameter of the inner surface 14. Thus, the seal body 12 preferably forms an "L" shaped cross section.

The circumferential rib 30 includes a channel or annular groove 32 within a side face 33. Alternatively, the circumferential rib 30 may include a distal lip portion 31 which extends axially outward from the side face 33 to effectively form a similar groove structure 32. This annular groove 32 is adapted to receive an interior sealing element as will be described in greater detail below. As will also be described in greater detail below, the circumferential rib 30 may be provided without an inner sealing groove 32. The inner surface 14, circumferential rib 30 and the inner annular groove 32 are all coaxially aligned and are preferably adapted to be generally coaxial with a respective shaft.

The outer diametrical surface 16 of the seal body 12 defines an outer diameter which is slightly less than the diameter of the seal bore 26 formed within a seal housing adapted for receiving the respective rebuildable seal 10. This difference in diameter forms an annular gap between the outer surface 16 of the seal body and the inner surface 28 of the respective seal bore 26 as best illustrated in FIG. 2. The annular gap advantageously allows the rebuildable seal 10 to be readily seated and removed with respect to the seal housing 24. Alternatively, the seal body 12 may have a diameter substantially equivalent to the respective seal bore 26 to allow a sealable press fit as is commonly used and known to those of skill in the art.

In a preferred embodiment, the outer surface 16 is configured for supporting a pair of outer sealing elements 20. Each of these outer sealing elements 20 circumferentially surrounds the seal body 12 and seals between the seal body and a respective seal bore. By filling the annular space or gap between the outer diameter 16 of the seal body 12 and the inner surface 28 of the seal bore 26, sealing is accomplished. Additionally, the outer sealing elements 20 may be made from an elastic material to accommodate diametrical thermal expansion and contraction of the rebuildable seal 10 while maintaining sealable contact against the seal bore.

In the illustrated embodiment, the outer surface 16 includes a pair of spaced-apart circumferential grooves 34. Each of these outer grooves 34 is adapted to seat an outer sealing element 20. Preferably, each of the outer grooves 34 is an O-ring groove and each sealing element 20 is an appropriately sized conventional O-ring, such as an elastomer O-ring. However, a single or plurality of grooves 34 may be provided and each groove may be any shape or configuration which sealably supports an outer sealing element 20 capable of sealing between the outer diametrical surface 16 and the respective seal bore 26.

The outer diametrical surface 16 is thus, preferably circular. However, the outer surface 16 may be made in any shape which may be sealably attached to the seal housing 24. For example, the outer surface 16 may be any shape which allows a sealable fit within the seal bore. More specifically, the seal body 12 may be configured for a press fit into a respective seal bore. In this configuration, there may be no need for the outer grooves 34. Alternatively, the seal body 12 and thus, the outer surface 16, may be enlarged to extend diametrically beyond and around the seal bore 26 and to include fastening holes or components (not shown) for sealable securement against the sidewall of the seal housing 24 adjacent the seal bore 26.

Each of the annular edges of the seal body 12 may be chamfered. In particular, the outer diametrical edges defining the outer surface 16 each has a chamfer 35. Chamfering facilitates the installation and removal of the seal body 12 within a seal bore 26 by, for example, reducing the need to perfectly align the seal body with the seal bore. In addition, each of the inner diametrical edges defining the inner diametrical surface of the circumferential rib 30 is preferably configured with a chamfer 37. This configuration facilitates installation and removal of the rebuildable seal 10 with respect to a shaft 22 and without scratching or damaging the shaft.

The seal body 12 may be made from any structural material capable of sealably compressing a sealing element 18 against the end flange 17 while handling the stresses and particulars of the application. Preferably, the seal body 12 may be constructed from a metal and more preferably, from an aluminum. However, other materials may be used, such as plastics, composites and even ceramics. For accuracy of dimensions and tolerances, the seal body 12 is machined from a piece of aluminum. However, other methods of construction may be used, such as casting.

Referring now to FIG. 6, the end flange 17 will be described in greater detail. In particular, the annular end flange 17 extends radially from an inner flange surface 36 to an outer flange surface 38. Preferably, the end flange 17 includes an axially protruding annular rim 40 and forms an "L" shaped cross section. The annular rim 40 is adapted to be coaxially engageable within the inner diameter of the seal body 12 and thus, has a smaller overall outer diameter than the inner diameter of the inner surface 14 of the seal body 12 (FIG. 5). Preferably, the end flange 17 and the annular rim 40 are circular. This configuration allows axial engagement without substantial side play. A plurality of fastener holes 41 pass through the end flange 17 between the inner and outer axial facing flange surfaces. Preferably, these fastener holes 41 include a countersunk portion and are aligned generally parallel with the protruding annular rim 40.

Similar to the seal body 12, the end flange 17 may be made from any structural material capable of sealably compressing the sealing element 18 against the seal body 12 (FIG. 3) while handling the stresses and particulars of the application. Preferably, the end flange 17 may be constructed from a metal and more preferably, from an aluminum. However, other materials may be used, such as plastics, composites and even ceramics. For accuracy of dimensions and tolerances, the end flange 17 is machined from a piece of aluminum, such as a piece of aluminum tubing. However, other methods of construction may be used, such as casting or forging.

Referring back to FIGS. 3 and 4, when the end flange 17 is coaxially engaged with the seal body 12, an inner circumferential slot or groove 42 is formed between the inner side face 33 on the circumferential rib 30 and the axially protruding rim 40 on the end flange. This inner circumferential slot 42 has an axial width which is narrowed as the end flange 17 is further engaged axially into the seal body 12. The inner slot 42 is at a minimum width when the end flange 17 is fully engaged into the seal body 12. In the illustrated embodiment, this occurs when an inner side 44 of the end flange 17 contacts against an opposing inner side 46 of the seal body. This configuration physically prevents further engagement of the end flange 17 into the seal body 12.

The outer diameter of the end flange 17 is preferably no greater than the outer diameter of the sealing body 12. This configuration ensures that the outer surface 38 of the end flange 17 will not prevent the placement or removal of the rebuildable seal 10 within a seal bore. This configuration also allows the end flange 17 to be readily removed from the seal body 12 while the seal body remains within the seal bore 26 (FIG. 2). Similarly, the inner diameter 36 of the end flange 17 is preferably not smaller than an inner diameter defined by the inwardly protruding circumferential rib 30 on the seal body 12. Similar to the seal body 17, the inner and outer diametrical edges of the end flange 17 have a chamfer 39.

An annular sealing element 18 is used to seal between the seal body 12 and the shaft 22 (FIG. 3). The sealing element 18 extends radially between a sealing lip 48 and an outer circumferential portion 50. As is typical in radial lip seal technology, the sealing lip 48 is configured with a diameter slightly smaller than the diameter of the respective shaft to be sealed. The sealing lip 48 is adapted to make sealable contact around the outer surface of the shaft.

The outer circumferential portion 50 of the sealing element 18 is seated within the inner circumferential slot 42 formed between the seal body 12 and the end flange 17. Engaging the end flange 17 into the seal body 12 with the sealing element 18 therebetween acts to compress the sealing element and seal the outer diametrical seal portion 50 against the seal body. An internal sealing element 52 is provided to facilitate and maintain the seal between the sealing element 18 and the seal body 12.

The internal sealing element 52 is seated in the inner annular groove 32 formed within the inner side face 33 of the circumferential rib 30. The inner sealing element 52 is made from an elastic material so that when compressed between the circumferential rib 30 and the annular rim 40 of the end flange 17, it is compressed and maintains a constant compressive load against the outer circumferential portion 50 of the sealing element 18. This load maintains sealable contact between the seal body 12 and the sealing element 18 while preventing flow creep and similar problems common with fluoroplastic materials. Preferably, the inner sealing element 52 is an O-ring type seal, such as an elastomer O-ring, and the inner annular groove 32 is a conventional O-ring groove. However, other forms of elastic circular seals may be used and having most any cross section.

It is noted that when using particular sealing elements 18, and in particular applications, an internal sealing element 52 may not be necessary and may even be undesirable. Thus, the need and particular placement and type of internal sealing element 52 will vary according to the particular application. In a similar fashion, the inner annular groove 32 may also be omitted, leaving the inner side face 33 of the circumferential rib 30 flat.

It should also be noted that the axial inner side 44 of the end flange 17 may also be provided with a groove or slot for supporting a second internal sealing element (not shown). In a particular application having opposing inner sealing elements, the sealing element 18 may be sufficiently compressed between the seal body 12 and the end flange 17 to prevent rotational movement and leakage therebetween but, sufficiently loose to allow the sealing element to float within the circumferential slot 42.

Referring now, in particular, to FIG. 3, the sealing element 18 is generally funnel shaped with the sealing lip 48 curving axially away from the outer circumferential portion 50. More specifically, the outer circumferential portion 50 is compressed within the inner circumferential slot 42 between the seal body 12 and the annular ring 40 of the end flange 17. The sealing lip 48 protrudes radially inward from both the circumferential rib 30 and the inner side 36 of the end flange 17 to provide annular contact with the shaft 22 (FIG. 2). The sealing lip 48 is adapted specifically for sealable and slidable contact against the shaft 18 (FIG. 2).

Referring now to FIG. 3 in conjunction with FIG. 4, assembly of the rebuildable radial seal 10 of the present invention will be described. During assembly, the sealing element 18 is coaxially aligned with the seal body 12 and placed within the diameter of the inner surface 14 and adjacent the inner side face 33 of the circumferential rib 30. To enhance sealing between the outer circumferential portion 50 of the sealing element 18 and the seal body 12, the internal annular sealing element 52, in this case an O-ring, is first seated within the inner annular groove 32.

The end flange 17 is then coaxially engaged with the seal body 12. More specifically, the protruding annular rim 40 is inserted into the seal body 12 until the rim contacts the outer circumferential portion 50 of the sealing element 18. Further engagement of the end flange 17 into the seal body 12 narrows the inner circumferential slot 42. This narrowing leads to a compression of the internal sealing O-ring 52 against the outer portion 50 of the sealing element 18. The compressive force acts to effectively seal the sealing element 18 with the seal body 12.

Fasteners 54 are used to coaxially secure the end flange 17 to the seal body 12 and maintain the sealing element 18 sealably compressed therebetween. As illustrated, the fasteners 54 are socket head cap screws which are threadably engaged within a plurality of spaced-apart fastener holes 56 in the seal body 12. However, the fasteners may be any means or method of securing the end flange 17 within the seal body 12. For example, the fasteners 54 may include, studs which extend outwardly from the inner side 46 of the seal body 12 and pass through the end flange 17 and which are then bolted or otherwise secured. Alternatively, the inner surface 14 of the seal body 12 may be provided with internal threads and the annular rim 40 provided with mating external threads. In this configuration, the end flange 17 may preferably be provided with spaced-apart pin holes, facets or other gripping features which allow it to be readily removed or engaged with the seal body 12.

When the sealing element 10 or other component of the rebuildable seal 10 wears or otherwise needs replacement, it may be readily replaced by simply replacing the specific component. For example, replacement of the sealing element 18 is accomplished by simply removing the engaged end flange 17 from the seal body 12 and removing the sealing element. A new sealing element 18 is inserted and the end flange 17 is re-engaged into the seal body 12 as previously described. In some applications, the replacement of the sealing element 18 may even be done with the seal body mounted within the seal housing.

Referring now to FIGS. 7 and 8, the sealing element 18 will be described in greater detail. As previously described and illustrated, the sealing element is in the form of an annular disk which extends radially outwardly from the sealing lip 48 to the outer circumferential portion 50. Preferably, the outer circumferential portion 50 is a relatively flat disc-shaped portion with the remaining portion of the seal 18, i.e., the portion protruding radially inward from the inner surface 14 of the seal body 12 (FIG. 3), forming a funnel shaped annulus. This funnel shape provides a curved surface for sealable contact against the shaft 22 (FIG. 2).

The sealing element 18 may be made from a flexible material which is capable of making and maintaining sealable contact against a movable shaft and as is well known in the seal technology. Preferably, the sealing element 18 is made from a plastic such as a fluoroplastic plastic material. Suitable types of fluoroplastic materials include tetrafluoroethylene (TFE), polytetrafluoroethylene (PTFE), fluorinated ethylene-propylene (FEP), perfluoroalkoxy fluorocarbon resin (PFA), polychlorotrifluoroethylene (PCTFE), ethylene-chlorotrifluoroethylene copolymer (ECTFE), ethylene-tetrafluoroethylene copolymer (ETFE), polyvinylidene fluoride (PVDF), polyvinyl fluoride (PVF) and the like that are known to provide wear properties, even under low lubricity conditions. A filler may be added to the fluoroplastic material to improve wear resistance and other seal properties. Fillers may include, for example, ground carbon particles, ground graphite particles, small particles of fiberglass, as well molybdenum disulfide. In some applications, the filler material may be concentrated adjacent the lip portion 48 of the sealing element 18.

The sealing element 18 may alternatively be made from other plastic materials, such as a ultra-high molecular weight polyethylene (UHMW) or even an elastomer. Elastomer rubber sealing elements 18 are inexpensive and may provide better or equivalent performance in some applications. Depending on the particular application and desired operating properties, any type of sealing element 18 may be preferred. Hydrodynamic threads may be incorporated into the sealing element 18 to provide a positive pumping action and allow for lubricants to penetrate under the sealing lip 48. This reduces friction and wear at the sealing lip 483 and shaft 22 interface (FIG. 2).

Figure 9B:
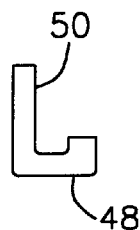
Figure 9C:
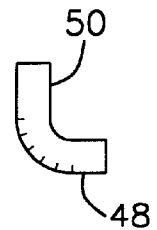
Figure 9D:
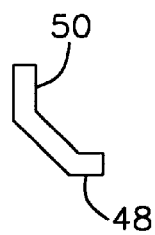
Figure 9E:
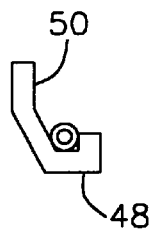
Figure 9F:
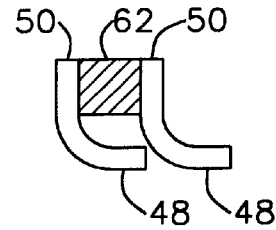
Figure 9G:
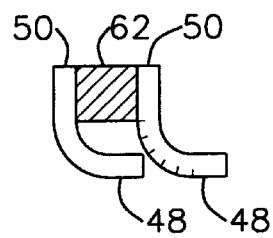
Figure 9H:
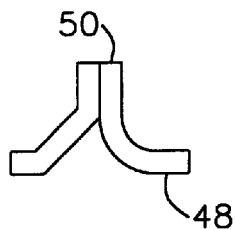

Referring now to FIG. 9, the sealing element 18 may be provided in many different cross sectional geometries, each providing different sealing features. Each of these different geometries may also be provided in the various described materials, such as the fluoroplastic or elastomer materials. As illustrated, the sealing element 18 may also comprise a number of individual sealing elements. These may be a plurality or stack of identical sealing elements 18 or a stack including differing types of elements. For example, the sealing element 18 may include a stack of sealing elements as previously described, either adjacent each other or spaced apart.

In addition to the sealing element 18, a scraper element or scraper elements may be incorporated into the rebuildable seal of the present invention. The scraper element may be any annular seal type element adapted for preventing abrasive contamination from contacting or penetrating under the sealing lip 48 as is known to those of skill in the art. This configuration may be particularly useful in abrasive sealing applications, such as, for example mixers. The scraper elements may be provided as a separate element or alternatively, formed as a part of the sealing element 18.

The sealing element 18 or sealing elements may also, for example, be spring loaded. These spring loaded configurations provide high unit loading and tracking for applications that have large amount of shaft run out, bore to shaft misalignment or shaft deflection (FIG. 2). The sealing element 18 may also be formed as a split sealing element as is known in radial split seal technology.

Referring now to FIG. 10, an alternative embodiment of the a rebuildable seal 60 constructed in accordance with the principles of the present invention is shown. In this embodiment, like features to those of the previous embodiment is designated by identical reference numerals followed by the letter "A". As shown, the rebuildable seal 60 includes an end flange 17A having an axially protruding rim 40A similar to the previous embodiment. However, in this embodiment, the annular rim 40A axially protrudes much less.

In order to enable the axial compression of the sealing element 18A and the internal sealing element 52A, a spacer washer 62 is coaxially inserted between the sealing element and the inner side 44A of the annular rim 40A. This spacer washer 62 acts in a similar fashion as the annular rim 40A of the end flange 17A. However, the use of an end flange 17A having an axially narrower protruding annular rim 40A advantageously allows the use of differing sealing elements 18A. In particular, the narrower annular rim 40A forms a wider inner circumferential slot 42A. This wider inner slot 42A will accommodate a wider variety of sealing element 18A geometries or even multiple sealing elements. Various width spacing washers 62 may be used depending on the width of the particular outer circumferential portion 50A of the sealing element 18A.

Referring now to FIG. 11, another alternative embodiment of the a rebuildable seal 70 constructed in accordance with the principles of the present invention is shown. In this embodiment, like features to those of previous embodiments are designated by identical reference numerals followed by the letter "B". As shown, the rebuildable seal 70 includes an annular sealing element 18B having multiple sealing components. More specifically, the sealing element 18B includes a first annular sealing element 72 which is located adjacent the inwardly protruding circumferential rib 30B on the seal body 12B and a second annular sealing element 74 which is placed against the axially protruding rim 40B on the end flange 17B.

A spacing washer 62B separates the first and second sealing elements or disks 72 and 74. The end flange 17B has a narrow annular rim 40B as described in the above embodiment. This narrow rim 40B accommodates the increased width of the multiple sealing elements 72 and 74 and the spacing washer 62B. However, the spacing washer 62B may be eliminated where stacking of the sealing elements 72 and 74 is desired or where an additional sealing element 18B or the like is used.

In the illustrated embodiment, each of the sealing elements 72 and 74 is substantially similar. For example, each of the sealing elements may comprises a fluoroplastic annular sealing disk as previously described. Multiple sealing element 72 and 74 configurations provide greater sealing reliability in many applications. Alternatively, different types of sealing elements 18B may be mixed, or even a scraper or wiper may be included. A single sealing element 18B may also be used but configured with multiple sealing lips 48B.

Referring now to FIGS. 12 and 13, the spacer washer 62 will be described in greater detail. As shown, the spacer washer 62 is a generally flat annular disk and is configured to fit within the seal body 12 (FIG. 4). Preferably, the spacer 62 has a radially height or thickness which is substantially equivalent to the outer diametrical portion 50 of the sealing element 18 (FIG. 7). This allows the washer 62 to properly compress against the sealing element. The axial thickness of the washer 62 may be configured to ensure that when the end flange 17 is engaged in the seal body 12, the sealing element 18 or elements are sealably compressed and prevented from moving, as best illustrated in FIG. 3. However, in some embodiments the sealing washer 62 may be slightly undersized to allow some float of the sealing element 18 within the circumferential slot 42 (FIG. 3) as previously described.

The spacing washer 62 may be made from any material compatible with the sealing element 18 or elements and sufficiently strong to transmit compression into the sealing element. Preferably, the spacing washer 62 is made from a metal such as an aluminum.

In brief summary, the rebuildable radial lip seal 10 allows for simple replacement of worn seal components without the need to replace the entire seal. This design also allows the replacement of a particular material sealing element with an alternative material sealing element to improve wear performance and friction characteristics at the sealing lip and shaft interface. Further, the design allows the configuration and type of sealing element to be readily changed without having to replace the entire seal. The design advantageously reduces costs as well as reducing the amount of hazardous waste by retaining the main portion of the seal for rebuilding and by replacing inferior seal designs that leak.

It will be understood that various modifications may be made to the present invention herein disclosed without departing from the spirit and scope thereof. For example, various configurations and combinations of the seal body and the end flange are contemplated which are engageable to securely maintain a sealing element therebetween while permitting removal and replacement. Additionally, various configurations, types and numbers of seals are contemplated for use within the seal body and end flange. Also, various modifications may be made in the size, thickness, diameter, shape, materials and configuration of the parts and their interaction. Therefor, the above description should not be construed as limiting the invention but merely an exemplification of preferred embodiments thereof. Those of skill in the art will envision other modifications within the scope and spirit of the present invention as defined by the claims appended hereto.

What is claimed is:

1. A rebuildable radial seal having a replaceable sealing element for sealably surrounding a shaft, the rebuildable radial seal comprising:

an annular seal body;

an annular end flange axially engageable with the seal body; and an annular sealing element sealably captured between the seal body and the end flange, the sealing element having a substantially funnel-shaped body defined by opposed sidewall surfaces that extend between opposed radial ends, the sealing element including a sealing lip that is adapted to be placed in contact with the shaft and that is formed from one of the sidewall surfaces.

2. A rebuildable seal as recited in claim 1 wherein the annular seal body radially extends between an inner seal body diameter and an outer diameter.

3. A rebuildable seal as recited in claim 2 wherein the sealing element comprises a fluoroplastic material.

4. A rebuildable seal as recited in claim 2 wherein the sealing lip has an inner diameter which is less than the inner diameter of the seal body and less than an inner diameter of the end flange.

5. A rebuildable seal as recited in claim 1, and further comprising a second sealing element, said second sealing element adapted for sealing between the seal body and a seal housing.

6. A rebuildable seal as recited in claim 5 wherein the second sealing element comprises at least one O-ring circumferentially surrounding the seal body.

7. A rebuildable seal as recited in claim 1, and further comprising a plurality of fasteners for coaxially securing the seal body and the end flange together with the sealing element coaxially compressed therebetween.

8. A rebuildable seal as recited in claim 1, and further comprising an annular spacing washer adapted to coaxially seat between the seal body and the end flange to facilitate sealing between the sealing element and at least one of the seal body and the end flange.

9. A rebuildable radial lip seal having a replaceable sealing element for sealing around a movable shaft and for removable placement within a seal housing, the rebuildable radial seal comprising:

an annular sealing body extending radially between an inner seal surface and an outer seal surface, the inner seal surface defining a first inner diameter and having a radially inward protruding circumferential rib;

a circumferential outer seal for sealing between the outer surface and a cylindrical bore within the seal housing;

an annular end flange having a coaxially protruding annular rim which is engageable within the first inner diameter of the seal body to form a circumferential inner slot between the circumferential rib and the inner surface of the seal body and the annular rim on the end flange;

an annular sealing element having an inner diameter portion defining a sealing lip adapted for circumferential sealing contact against the movable shaft, and having an outer diameter portion sealably captured within the inner circumferential slot formed between the seal body and the end flange, wherein a substantial portion of the sealing element extending from the circumferential slot is free from contact with the sealing body and end flange; and a fastener for coaxially securing seal body and the end flange together with the sealing element coaxially compressed therebetween; and wherein the sealing lip extends radially inward from the end flange and the inner surface of the seal body.

10. A rebuildable radial lip seal as recited in claim 9 wherein the fastener comprises a plurality of fasteners extending axially between the seal body and the end flange.

11. A rebuildable radial lip seal as recited in claim 9 wherein the fastener comprises a threaded portion on the end flange and a mating threaded portion on the seal body.

12. A rebuildable radial lip seal as recited in claim 9 wherein the sealing element comprises a fluoroplastic material.

13. A rebuildable radial lip seal as recited in claim 12 wherein the sealing element comprises polytetrafluoroethylene.

14. A rebuildable radial lip seal as recited in claim 12 wherein the fluoroplastic material comprises a filler.

15. A rebuildable radial lip seal as recited in claim 9 wherein the sealing element comprises an elastomeric material.

16. A rebuildable radial lip seal as recited in claim 9 wherein the sealing element comprises a plurality of sealing lips.

17. A rebuildable radial lip seal as recited in claim 9 wherein the sealing element comprises a plurality of sealing elements.

18. A rebuildable radial seal having a replaceable sealing element for sealing around a rotatable shaft and for removable placement within a seal housing, the rebuildable radial seal comprising:

an annular sealing body extending radially between an annular inner seal surface and an annular outer seal surface, the inner seal surface defining a first inner diameter and having a radially inward protruding circumferential rib;

a circumferential outer seal for sealing between the outer surface and a cylindrical bore within the seal housing, the outer seal at least partially seated within a circumferential groove in the outer seal surface;

an annular end flange having a coaxially protruding annular rim which is engageable within the first inner diameter of the seal body and which is coaxial with the seal body to form a circumferential inner groove between the circumferential rib and the inner surface of the seal body and the annular rim on the end flange, wherein the end flange has an inside diameter that is substantially coterminous with an inside diameter of the sealing body circumferential rib;

an annular sealing element having an inner sealing lip adapted for circumferential sealing contact against the rotatable shaft, said sealing element having an outer portion sealably captured within the inner circumferential groove formed between the seal body and the end flange, wherein a substantial portion of the sealing element extending radially from the circumferential groove is free from contact with the sealing body; and a fastener for coaxially securing seal body and the end flange together with the sealing element coaxially compressed therebetween; and wherein the sealing lip extends radially inward from the end flange and the inner surface of the seal body.

19. A rebuildable radial lip seal as recited in claim 18 wherein the outer seal comprises a plurality of sealing elements.

20. A rebuildable radial lip seal as recited in claim 19 wherein the sealing elements comprise spaced-apart O-rings.

21. A rebuildable radial lip seal as recited in claim 20 comprising more than one axially spaced apart circumferential groove in the outer seal surface, wherein each of the O-rings is seated within such respective circumferential grooves.

* * * * *